United States Patent
Pochapsky

(10) Patent No.: US 7,554,740 B2
(45) Date of Patent: Jun. 30, 2009

(54) SYSTEM AND METHOD FOR OPTICAL IMAGE GENERATOR AND INJECTOR

(75) Inventor: Eugene J. Pochapsky, Cheswick, PA (US)

(73) Assignee: Omnitech Partners, Inc., Freeport, PA (US)

( * ) Notice: Subject to any disclaimer, the term of this patent is extended or adjusted under 35 U.S.C. 154(b) by 0 days.

(21) Appl. No.: 11/986,561

(22) Filed: Nov. 21, 2007

(65) Prior Publication Data

US 2008/0137208 A1 Jun. 12, 2008

Related U.S. Application Data

(60) Provisional application No. 60/860,592, filed on Nov. 22, 2006.

(51) Int. Cl.
*G02B 27/12* (2006.01)
*H04N 9/07* (2006.01)
*G03B 21/28* (2006.01)

(52) U.S. Cl. .................... 359/630; 348/336; 353/81

(58) Field of Classification Search ............ 359/630, 359/629, 635–636, 638, 833–834; 348/336–338; 353/81

See application file for complete search history.

(56) References Cited

U.S. PATENT DOCUMENTS 4,181,440 A 1/1980 Schindler
6,160,665 A * 12/2000 Yuan .................. 359/629
6,301,044 B1 10/2001 Huber et al.
6,762,884 B2 * 7/2004 Beystrum et al. .......... 359/629
6,864,861 B2 3/2005 Schehrer et al.
7,142,357 B2 11/2006 Greenslade
2005/0083307 A1 4/2005 Aufderheide et al.

OTHER PUBLICATIONS

International Search Report and Written Opinion of the International Searching Authority issued in International Patent Application No. PCT/US2007/024289 dated Apr. 16, 2008.

* cited by examiner

*Primary Examiner*—Scott J Sugarman
*Assistant Examiner*—Dawayne A Pinkney

(57) ABSTRACT

An apparatus, system and method are provided to inject an image into a viewing optical system, which is used for viewing a scene. An image injector includes first and second optical elements with first and second sides, respectively, and a reflective material. The first side adjoins the second side and the reflective material is between the adjoining sides. An image generator is optically coupled to the second optical element and generates an image. The image injector is placed at the aperture of the viewing optical system and passes energy from the scene into the viewing optical system. The reflective material reflects energy from the image generator into the viewing optical system. The image generator may produce the image based upon an information signal from an information generator. The reflective material may reflect energy from the scene into an output optical system and the information generator produce the information signal based on the energy received in the output optical system.

21 Claims, 2 Drawing Sheets

SYSTEM AND METHOD FOR OPTICAL IMAGE GENERATOR AND INJECTOR

CROSS-REFERENCE TO RELATED APPLICATIONS

This patent application claims priority under 35 U.S.C. § 119(e) to U.S. Provisional Patent Application No. 60/860,592 entitled "Optical Injector System for Image Display or Image Receiving Applications" filed on Nov. 22, 2006, which is hereby incorporated by reference.

TECHNICAL FIELD

This disclosure is generally directed to optical systems and more particularly to a system and method for optical image generation and injection.

BACKGROUND

Often, it is desirable to inject an image or visual indicator into an image as viewed through a rifle sight, telescope, video camera or other viewing optical system. Such an injected image may supplement an image of a scene being viewed through the viewing optical system, for example by highlighting a portion of the image of the scene or by overlaying the image of the scene with a visual image of the scene in a non-visible portion of the electromagnetic spectrum. A visual indicator other than an image may be injected to provide a user of the viewing optical system with an indicator that may be viewed within the image of the scene. Such an indicator may provide an alert, warning, failure or other sort of indication.

Typically, image injectors are undesirably large and/or heavy. Known image injectors may also be fragile or subject to degraded performance in inclement operating conditions.

SUMMARY

Aspects of the invention may be found in an apparatus for use with a viewing optical system, where the viewing optical system is used for viewing a scene. The apparatus includes an image injector and an image generator. The image injector includes a first optical element that has a first side, a second optical element that has a second side, and a reflective material. The first side adjoins the second side and the reflective material is positioned between the first and second sides. The image generator is optically coupled to the second optical element and generates an image. The image injector is adapted to be placed adjacent to an input of the viewing optical system and energy from the scene passes through the image generator into the input of the viewing optical system. The reflective material reflects energy from the image generated by the image generator into the viewing optical system.

The apparatus may also include an output optical system that is optically coupled to the first optical element, where the reflective material reflects energy from the scene into the output optical system.

Other aspects of the invention may be found in an information display system for use with a viewing optical system, where the viewing optical system is used for viewing a scene. The information display system includes an information generator, an image injector, and an image generator. The information generator has an input signal and generates an information signal responsive to the input signal. The image injector includes a first optical element that has a first side, a second optical element that has a second side, and a reflective material. The first side adjoins the second side and the reflective material is positioned between the first and second sides. The image generator is optically coupled to the second optical element and generates an image responsive to the information signal. The image injector is adapted to be placed adjacent to an input of the viewing optical system and energy from the scene passes through the image generator into the input of the viewing optical system. The reflective material reflects energy from the image generated by the image generator into the viewing optical system.

The information display system may also include an output optical system that is optically coupled to the first optical element, where the reflective material reflects energy from the scene into the output optical system. The information generator may be coupled to an output of the output optical system and may generate the information signal responsive to a signal received from the output optical system.

Still other aspects of the invention may be found in method of injecting an image for use with a viewing optical system, where the viewing optical system is used for viewing a scene. The method includes transmitting energy from the scene through an image injector into the viewing optical system. The image injector includes a first optical element that has a first side, a second optical element that has a second side, and a reflective material. The first side adjoins the second side and the reflective material is positioned between the first and second sides. The method also includes generating an image with an image generator that is optically coupled to the second element. The method further includes reflecting energy from the image generated by the image generator into the viewing optical system, where the energy from the image is reflected by the reflective material.

The method may include receiving energy from the scene at an output optical system that is optically coupled to the first optical element, wherein the energy received at the output optical system is reflected by the reflective material, and generating the image responsive to the energy received at the output optical system.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

An image injector according to the present invention mounts in front of, or may be integrated into, a viewing optical system. The image injector passes energy from a scene to the viewing optical system and reflects energy from an image generator to the viewing optical system. The image generator produces an optical indication or an image. An image controller may send a signal to the image generator representing the optical indication or image to be injected into the viewing optical system's view of the scene. The image injector may also intercept and reflect energy from the scene to an output optical system.

Figure 1:
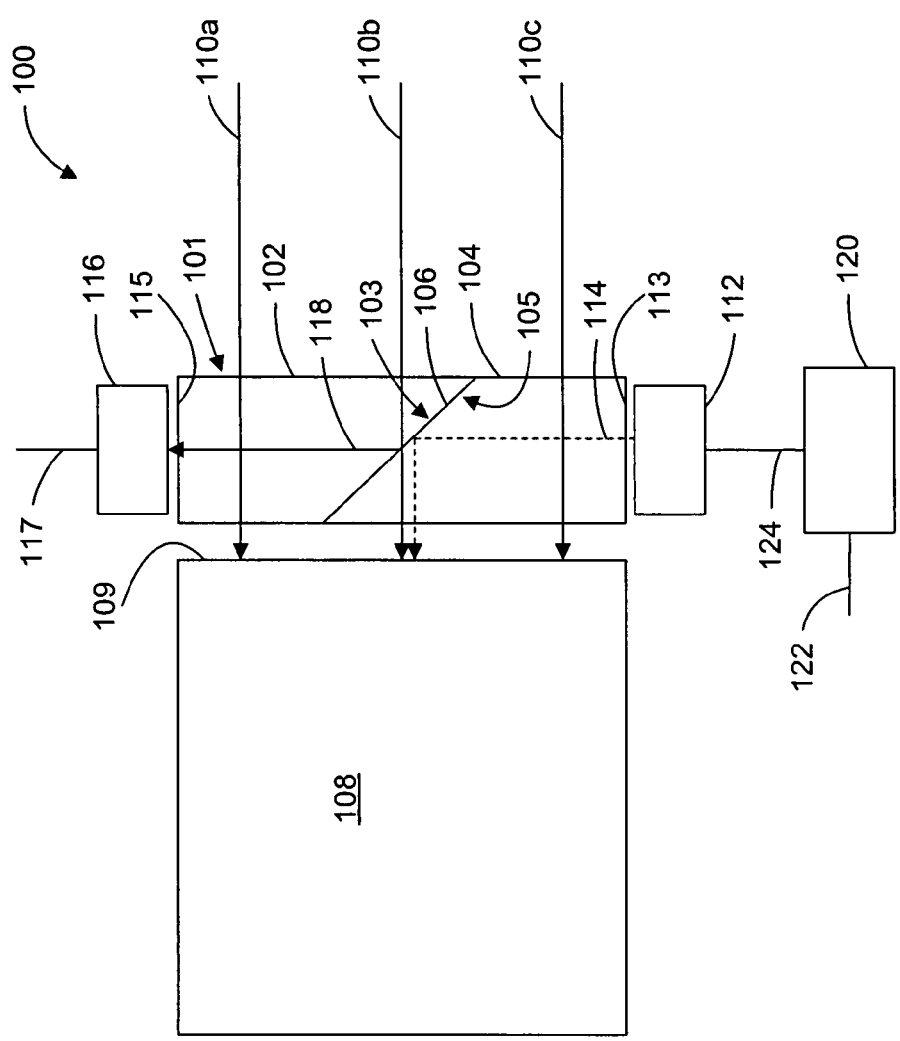
FIG. 1 depicts a schematic diagram of a system embodying the present invention.

FIG. 1 depicts a schematic diagram of an optical system 100 embodying the present invention. An image injector 101 in close proximity to an input or aperture 109 of a viewing optical system 108 and passes energy (indicated by rays or beams 110a, 110b and 110c) from a scene (not shown) into the input 109. The optical injector 101 also reflects energy (represented by a ray or beam 114) from an image generator 112 into the input 109 of the viewing optical system 108. In one embodiment, the image injector 101 is in contact with the input 109 of the viewing optical system 108 or is close enough that it does not obscure the entire aperture 109 of the viewing optical system 108.

The optical injector 101 includes a first optical element 102 and a second optical element 104. The first and second optical elements 102 and 104 have adjoining faces 103 and 105, respectively, which physically and optically couple the first and second optical elements 102 and 104 and define the mating surface 106, which will be further described with reference to FIG. 2. The rays 110a and 110c pass through the first optical element 102 and the second optical element 104, respectively, to the input 109 of the viewing optical system. The ray 110b passes through first optical element 102, the mating surface 106, and the second optical element 104 to the input 109 of the viewing optical system.

The image generator 112 is optically coupled to the second optical element 104 at another face 113 of the second optical element 104. The ray 114 from the image generator 112 passes through the face 113 and the second optical element 104 and is reflected by the mating surface 106 into the aperture 109 of the viewing optical system 108.

The face 113 may have a shape (such as flat or spherical) chosen to facilitate optical coupling between the image generator 112 and the second optical element 104. The index of refraction of the second optical element 104 material may be chosen to reduce an angular extent of the beam 114 incident on the mating surface 106 when compared to an equivalent angular extent of the beam 114 in air. As a result, the optical extent of the beam 114 at the edge of the second optical element 104 is smaller than the equivalent optical extent in air, allowing for smaller optics to be used in the image generator 112 when compared to an image generator used in an air-based image injector. Preferably, the beam 114 remains entirely within the second optical element 104 between the face 113 and the mating surface 106.

In some embodiments, an output optical system 116 is optically coupled to another face 115 of the first optical element 102. The mating surface 106 reflects a beam 118 through the first optical element 102 and the face 115 into the output optical system 116. The beam 118 includes all or part of the beam 110b.

The output optical system 116, in one embodiment, generates a visible image of the beam 118 for projection or direct viewing by a user of the optical system 100. In another embodiment, the output optical system 116 produces an electrical or optical signal on an output 117 that is representative of a characteristic of the scene being viewed by the optical system 100. For example, such a signal may represent an overall brightness level of the scene; whether a certain object is present or absent in the scene; an image of the scene in the visible, infrared, or other range of the electromagnetic spectrum; or other signal derived from the beam 118.

As described for the image injector 112, the face 115 may have a shape (such as flat or spherical) chosen to facilitate optical coupling between the output optical system 116 and the first optical element 102. The index of refraction of the first optical element 102 material may be chosen to reduce an angular extent of the beam 118 reflected from the mating surface 106 when compared to an equivalent angular extent of the beam 114 in air, allowing for smaller optics to be used in the output optical system 116 when compared to an air-based image injector. Preferably, the beam 118 remains entirely within the first optical element 102 between the mating surface 106 and the face 115.

An information generator 120 receives a signal on an input 122 and generates a signal on an output 124. The signal on the output 124 is an information signal representative of one or more characteristics of the signal on the input 122. The output 124 is coupled to the image generator 112, which generates an image according to the information signal on the output 124. The image generator 112 projects the generated image into the image injector 101 through the face 113, as represented by ray 114.

In one embodiment, the output 117 of the output optical system 116 is coupled to the input 122 of the information generator 120. In such an embodiment, the information signal generated by the information generator 120 is representative of the characteristic of the scene sensed by the output optical system 116. In another embodiment, the output 117 is coupled to a device or system outside the optical system 100.

In the embodiment shown in FIG. 1, the image injector 101 extends across substantially all of the aperture 109 of the viewing optical system 108 in the vertical direction. The image injector 101 and the mating surface 106 may extend across substantially all, or only a narrow strip, of the aperture 109 of the viewing optical system 108 in the horizontal direction (as shown in FIG. 1, into the page).

Because the mating surface 106 subtends only a portion of the aperture 109 of the viewing optical system 108, the image injector 101 has a depth dimension (horizontal in FIG. 1) that is significantly smaller than its vertical dimension. As shown in FIG. 1, the vertical dimension of the image injector 101 is substantially perpendicular to, and the depth dimension is substantially parallel to, the optical axis of the viewing optical system 108. It will be understood that in other embodiments the image injector may be oriented at an angle other than 90 degrees to the optical axis of the viewing optical system 108.

In other embodiments, the image injector 101, the image generator 112, and the output optical system 116 are integrated into, or fabricated as part of, the viewing optical system 108. In still other embodiments, one or both of the image generator 112 and the output optical system 116 are separately mounted to the integrated image injector and optically coupled to the faces 113 and 115, respectively.

Figure 2:
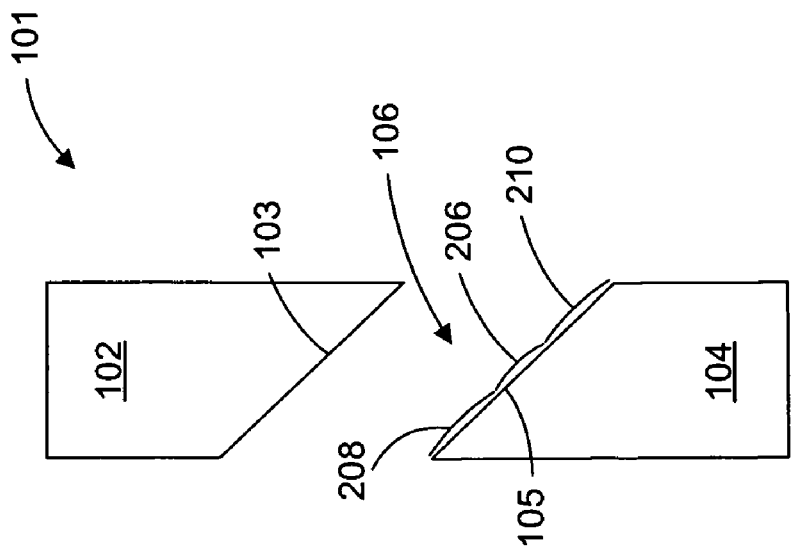
FIG. 2 presents an exploded view of an image injector according to the present invention.

FIG. 2 presents an exploded view of the image injector 101 according to the present invention. The first optical element 102 and the face 103 have been separated from the second optical element 104 and the face 105. Elements 206, 208 and 210 of the mating surface 106 are indicated on the face 105 of the second optical element 104, however it will be understood that the mating surface 106 may be located on the face 103 of the first optical element 102. It will also be understood that the mating surface 106 may be one or more materials that are separate from, but positioned between, the faces 103 and 105.

A portion 206 of the mating surface 106 is reflective. The portion 206, as shown, has a size smaller than one or both of the faces 103 and 105; however, it will be understood that the portion 206 may be coextensive with the faces 103 and 105. The portion 206 may be a coating on the face 103 or the face 105. Such a coating may be a metallic or dielectric material.

While the reflective portion 206 is shown in FIG. 2 in the center of the mating surface 106, it will be understood that the reflective portion 206 may be located anywhere in the mating surface 106. In one embodiment, the first and second optical elements 102 and 104 are bonded together at the mating surface 106 in order to maintain optical alignment between the faces 113 and 115 and the mating surface 106 despite rough physical treatment of the image injector 101.

The reflective portion 206 may have a reflectivity between 1 percent and 100 percent, inclusive. The portion 206 may reflect energy in the visible spectrum, all or part of the infrared spectrum, or in any other part of the electromagnetic spectrum. The portion 206 may reflect one portion of the spectrum and transmit other portions of the spectrum. The portion 206 may have any combination of these characteristics of reflectivity, transmissivity, and spectral response.

Where the portion 206 has a size less than the size of one or both of the faces 103 and 105, remaining portions 208 and 210 of the mating surface 106 may include an optical adhesive having an index of refraction that closely matches the index of refraction of the first and second optical elements 102 and 104, so as to minimize reflections from the portions 208 and 210. The portions 208 and 210 may additionally or alternatively include an antireflective coating on one or both of the faces 103 and 105. In other embodiments, the portions 208 and 210 of the mating surface 106, the first optical element 102, and the second optical element 104 may be untreated.

While the beam 114 is depicted as a single ray, it will be understood that the image generator 112 may be designed to generate a beam that converges on or near a reflective portion of the mating surface 106 and diverges again to fill the input 109 of the viewing optical system 108.

Because the image injector 101 is significantly closer to the viewing optical system 108 than the scene being viewed, when the scene is in focus, the reflective portion 206 and other elements of the mating surface 106 will be greatly out of focus to the user of the viewing optical system 108. When the image generator 112 is not generating an image, the presence of the reflective portion 206 will be undetectable to the user.

In one embodiment, the image generator 112 generates an image that has an apparent focus at a location that is closer to the viewing optical system than the scene being viewed by a user of the viewing optical system 108, for example, at or near the mating plane 106. In such an embodiment, by bringing the scene into focus with the viewing optical system 108, the user throws the image from the image generator 112 out of focus. As a result, the image will be perceived by the user as a 'wash' of light over all or part of the scene. Such an image may convey information by varying a color, intensity, rate or duty cycle of the image.

In another embodiment, the image generator 112 generates an image that has an apparent focus at a location that is substantially at the same distance from the viewing optical system 108 as the scene being viewed by a user of the viewing optical system 108. In such an embodiment, by bringing the scene into focus with the viewing optical system 108, the user would also bring the image generated by the image generator 112 into focus and be able to perceive detail in the image. Such an image could therefore include, for example, numbers, text and/or symbols. Such an image could include a processed image of the scene, acquired by the output optical system 116 or another sensor; an image of the scene with information removed or added; or an image of the scene acquired with a sensor observing the scene in a different region of the electromagnetic spectrum than the user. It will be understood that the image could include any combination of the above described image content.

In an embodiment intended for use with a viewing optical system responsive to energy in another part of the spectrum than visible light (for example, infrared), the image generator 112 generates an image in that other part of the spectrum. In an embodiment intended for use with a binocular viewing optical system, two image injectors are placed in front of two inputs to the binocular viewing optical system and either one image generator coupled to both image injectors or a separate image generator coupled to each of the image injectors.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for use with a viewing optical system, the viewing optical system operable for viewing a scene, the apparatus comprising:
   an image injector, comprising a first optical element having a first side, a second optical element having a second side, and a reflective material, wherein the first side adjoins the second side and the reflective material is positioned between the first side and the second side; and
   an image generator optically coupled to the second element and operable to generate an image,
   wherein the image injector is adapted to be placed adjacent to an input of the viewing optical system and is operable to pass energy from the scene therethrough into the input of the viewing optical system, a portion of the energy from the scene passing through the first optical element into the input of the viewing optical system without passing through the first side of the first optical element, and the reflective material is operable to reflect energy from the image generated by the image generator into the viewing optical system.

2. The apparatus of claim 1, further comprising an output optical system optically coupled to the first optical element, wherein the reflective material is further operable to reflect energy from the scene into the output optical system.

3. The apparatus of claim 1, wherein the reflective material is a coating on one of the first side and the second side.

4. The apparatus of claim 1, wherein the reflective material is 100 percent reflective.

5. The apparatus of claim 1, wherein the reflective material is reflective to infrared radiation and the image generator generates an infrared image.

6. The apparatus of claim 1, wherein the reflective material is one of a metallic material and a dichroic material.

7. The apparatus of claim 1, wherein a size of the reflective material is smaller than a size of the first side and a size of the second side.

8. The apparatus of claim 7, wherein the image injector further comprises a second material positioned between the first side and the second side, the second material comprising one of an antireflective coating and a refractive index matching material.

9. An information display system for use with a viewing optical system, the viewing optical system operable for viewing a scene, the information display system comprising:

an information generator, having an input signal and operable to generate an information signal responsive to the input signal;

an image injector, comprising a first optical element having a first side, a second optical element having a second side, and a reflective material, wherein the first side adjoins the second side and the reflective material is positioned between the first side and the second side; and an image generator optically coupled to the second element and operable to receive the information signal and generate an image responsive to the information signal, wherein the image injector is adapted to be placed adjacent to an input of the viewing optical system and is operable to pass energy from the scene therethrough into the input of the viewing optical system, a portion of the energy from the scene passing through the first optical element into the input of the viewing optical system without passing through the first side of the first optical element, and the reflective material is operable to reflect energy from the image generated by the image generator into the viewing optical system.

10. The information display system of claim 9, further comprising an output optical system optically coupled to the first optical element, wherein the reflective material is further operable to reflect energy from the scene into the output optical system.

11. The information display system of claim 10, wherein the information generator is:

coupled to an output of the output optical system, and further operable to generate the information signal responsive to a signal received from the output of the output optical system.

12. The information display system of claim 9, wherein the image generated by the image generator has an apparent focus at a location that is substantially equally distant from the viewing optical system as the scene.

13. The information display system of claim 12, wherein:

the image generated by the image generator includes at least one of numbers, text, and symbols; and the image generator generates the at least one of numbers, text, and symbols according to the information signal.

14. The information display system of claim 9, wherein the image generated by the image generator has an apparent focus at a location that is closer to the viewing optical system than the scene.

15. The information display system of claim 14, wherein:

the image generated by the image generator includes a characteristic that varies in at least one of color, intensity, rate, and duty cycle; and the image generator varies the characteristic according to the information signal.

16. A method of injecting an image for use with a viewing optical system, the viewing optical system operable for viewing a scene, the method comprising:

transmitting energy from the scene through an image injector into the viewing optical system, the image injector comprising:

a first optical element having a first side, a second optical element having a second side, and a reflective material, wherein the first side adjoins the second side, a portion of the energy from the scene passes through the first optical element into the viewing optical system without passing through the first side of the first optical element, and the reflective material is positioned between the first side and the second side;

generating an image with an image generator optically coupled to the second element; and reflecting energy from the image generated by the image generator into the viewing optical system, wherein the energy from the image is reflected by the reflective material.

17. The method of claim 16, further comprising generating an information signal responsive to an input signal, wherein generating an image further comprises generating the image responsive to the information signal.

18. The method of claim 17, wherein the image has an apparent focus at a location that is substantially equally distant from the viewing optical system as the scene, and generating the image further comprises generating at least one of numbers, text, and symbols within the image according to the information signal.

19. The method of claim 17, wherein the image has an apparent focus at a location that is closer to the viewing optical system than the scene, and the image has a characteristic that varies in at least one of color, intensity, rate, and duty cycle according to the information signal.

20. The method of claim 16, further comprising:

receiving energy from the scene at an output optical system optically coupled to the first optical element, wherein the energy received at the output optical system is reflected by the reflective material.

21. The method of claim 20, wherein generating an image further comprises generating the image responsive to the energy received at the output optical system.

* * * * *